US012096268B2

(12) United States Patent
Sundberg et al.

(10) Patent No.: US 12,096,268 B2
(45) Date of Patent: Sep. 17, 2024

(54) CLOSED LOOP REMOTE INTERFERENCE MANAGEMENT

(71) Applicant: Telefonaktiebolaget LM Ericsson (publ), Stockholm (SE)

(72) Inventors: Mårten Sundberg, Årsta (SE); Sebastian Faxér, Stockholm (SE); Filip Barac, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 650 days.

(21) Appl. No.: 17/290,612

(22) PCT Filed: Oct. 30, 2019

(86) PCT No.: PCT/EP2019/079698
§ 371 (c)(1),
(2) Date: Apr. 30, 2021

(87) PCT Pub. No.: WO2020/089313
PCT Pub. Date: May 7, 2020

(65) Prior Publication Data
US 2021/0400520 A1     Dec. 23, 2021

Related U.S. Application Data

(60) Provisional application No. 62/754,705, filed on Nov. 2, 2018.

(51) Int. Cl.
*H04W 28/02* (2009.01)
*H04W 72/27* (2023.01)
*H04W 72/541* (2023.01)

(52) U.S. Cl.
CPC ....... *H04W 28/0236* (2013.01); *H04W 72/27* (2023.01); *H04W 72/541* (2023.01)

(58) Field of Classification Search
CPC ............ H04W 28/0236; H04W 72/27; H04W 72/541
See application file for complete search history.

(56) References Cited

U.S. PATENT DOCUMENTS 10,321,294 B2*  6/2019  Chatterjee ................. H04L 5/14
2009/0323598 A1* 12/2009  Stamoulis ............. H04W 72/54
                                                        370/329

(Continued)

FOREIGN PATENT DOCUMENTS

| CN | 102006100 A | 4/2011 |
| CN | 107431504 A | 12/2017 |
| CN | 108429592 A | 8/2018 |

OTHER PUBLICATIONS

International Search Report and Written Opinion dated Jan. 29, 2020 for International Application No. PCT/EP2019/079698 filed Oct. 30, 2019, consisting of 14-pages.

(Continued)

*Primary Examiner* — Abdullahi Ahmed
(74) *Attorney, Agent, or Firm* — Weisberg I.P. Law, P.A.

(57) ABSTRACT

Methods and apparatuses are disclosed for a closed-loop remote interference management framework. In one embodiment for a victim node, a method includes determining one of at least two messages corresponding to a closed-loop feedback for remote interference mitigation, the at least two messages comprising a first message and a second message, the first message providing a positive mitigation indication and the second message providing a negative mitigation indication, and transmitting the determined one of the at least two messages to another network node. In another embodiment for an aggressor node, a method includes receiving one of at least two messages corresponding to a closed-loop feedback for remote interference miti- (Continued)

gation, and taking a remote interference mitigation action based on the received one of at least two messages.

26 Claims, 11 Drawing Sheets

(56) References Cited

U.S. PATENT DOCUMENTS

| | | | | |
|---|---|---|---|---|
| 2020/0044764 A1* | 2/2020 | Xu | ........................ | H04L 5/0048 |
| 2020/0107227 A1* | 4/2020 | Xu | ........................ | H04J 11/0056 |
| 2021/0274511 A1* | 9/2021 | Cao | ........................ | H04W 24/10 |
| 2021/0306127 A1* | 9/2021 | Sundberg | .............. | H04L 5/0048 |
| 2021/0328749 A1* | 10/2021 | Barac | .................... | H04L 5/0073 |
| 2023/0090167 A1* | 3/2023 | Wang | .................. | H04W 52/367 |
| | | | | 370/252 |

OTHER PUBLICATIONS

3GPP TSG RAN WG1 Meeting #94bis R1-1812060; Title: Updated summary for NR-RIM; Agenda Item: 7.2.5; Source: CMCC; Document for: For Information; Date and Location: Oct. 8-12, 2018, Chengdu, China, consisting of 37-pages.

Chinese Office Action and Search Report and English Summary dated Sep. 21, 2023 for Patent Application No. 201980087720.7, consisting of 6 pages.

* cited by examiner

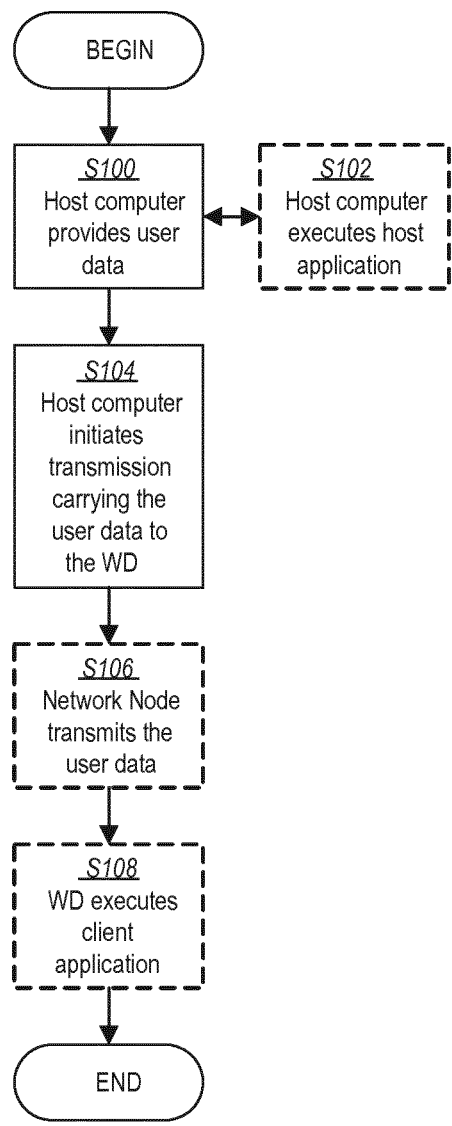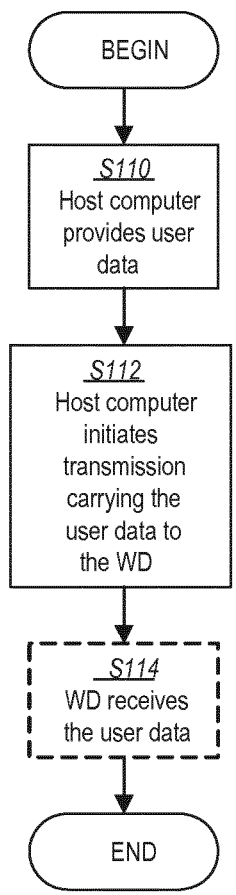
FIG. 7
FIG. 8

CLOSED LOOP REMOTE INTERFERENCE MANAGEMENT

CROSS-REFERENCE TO RELATED APPLICATIONS

This application is a Submission Under 35 U.S.C. § 371 for U.S. National Stage Patent Application of International Application No.: PCT/EP2019/079698, filed Oct. 30, 2019 entitled "CLOSED LOOP REMOTE INTERFERENCE MANAGEMENT," which claims priority to U.S. Provisional Application No. 62/754,705, filed Nov. 2, 2018, entitled "CLOSED-LOOP REMOTE INTERFERENCE MANAGEMENT," the entireties of both of which are incorporated herein by reference.

TECHNICAL FIELD

The present disclosure relates to wireless communication and in particular, to closed-loop remote interference management (RIM).

BACKGROUND

Interference Protection in Time Division Duplex (TDD) Networks

Wireless cellular networks are generally built up of, i.e., organized into, cells. Each cell may be defined by a certain coverage area of a network node, such as a radio base station (BS), e.g., eNB, gNB, etc. The network nodes wirelessly communicate with terminals/wireless devices (WDs), such as user equipments (UEs) in the network. The communication may be carried out in either paired or unpaired spectrum. In the case of paired spectrum, the downlink (DL), i.e., from the network node to the wireless device, and uplink (UL), i.e., from the wireless device to the network node, directions can be separated in frequency, called Frequency Division Duplex (FDD). In the case of unpaired spectrum, the DL and UL may use the same spectrum, called Time Division Duplex (TDD). As the name implies, the DL and UL may be separated in the time domain, typically with a guard periods (GP) between the DL and UL channel. A guard period can serve several purposes. For example, the processing circuitry at the network node and WD should have sufficient time to switch between transmission and reception. However, this is typically a fast procedure and does not significantly contribute to the requirement of the guard period size. There can be one guard period at a downlink-to-uplink switch and one guard period at an uplink-to-downlink switch, but since the guard period at the uplink-to-downlink switch generally only needs to have enough time to allow the network node and the WD to switch between reception and transmission, and consequently typically is small, it is for simplicity not discussed in detail in the following description.

The guard period (GP) at the downlink-to-uplink switch, however, should generally be sufficiently large to allow a WD to receive a (time-delayed) DL grant scheduling the UL and also transmit the UL signal with a proper timing advance (e.g., compensating for the propagation delay) such that the UL signal is received in the UL part of the frame at the network node. In fact, the guard period at the uplink-to-downlink switch is created with an offset to the timing advance. Thus, the GP for the downlink-to-uplink switch (referred to below for brevity as simply "GP") should be larger than two times the propagation time towards a WD at the cell edge. Otherwise, the UL and DL signals in the cell will interfere. Because of this, the GP is typically chosen depending on the cell size such that larger cells (e.g., larger inter-site distances) have a larger GP and vice versa for smaller cells.

Additionally, the guard period can reduce the DL-to-UL interference between network nodes by allowing a certain propagation delay between cells without having the DL transmission of a first network node enter the UL reception of a second network node. In a typical macro network, the DL transmission power can be on the order of 20 decibels (dB) larger than the UL transmission power, and the pathloss between network nodes, perhaps above roof top and in line-of-sight (LOS), may often be much smaller than the pathloss between network nodes and terminals/WDs (in non-LOS (NLOS)). Hence, if the UL is interfered by the DL of other cells, so called "cross-link interference," the UL performance can be seriously degraded. Because of the large transmit power discrepancy between UL and DL and/or propagation conditions, cross-link interference can be detrimental to system performance not only for the co-channel cases (where the DL interferes with the UL on the same carrier) but also for the adjacent channel case (where the DL of one carrier interferes with the UL on an adjacent carrier). Because of this, TDD macro networks are typically operated in a synchronized and aligned fashion where the symbol timing is aligned and a semi-static TDD UL/DL pattern is used which is the same for all of the cells in the network (NW). This may be performed by aligning uplink and downlink periods so that such periods do not occur simultaneously. This may reduce interference between uplink and downlink. Typically, operators with adjacent TDD carriers also synchronize their TDD UL/DL patterns to avoid adjacent channel cross-link interference.

The principle of applying a GP, at the downlink-to-uplink switch, to avoid DL-to-UL interference between network nodes is shown in FIG. 1, where a victim network node (V) is being (at least potentially) interfered by an aggressor network node (A). FIG. 1 shows the aggressor sending a DL signal to a device in its cell, the DL signal also reaching the victim network node (the propagation loss is not enough to protect it from the signals of A) which victim node is trying to receive a signal from another terminal (not shown in the figure) in its cell. The signal has propagated a distance (d) and due to propagation delay, the experienced frame structure alignment of A at V is shifted/delayed t second, proportional to the propagation distance d. As can be seen from FIG. 1, although the DL part of the aggressor network node (A) is delayed, it does not enter the UL region of the victim (V) due to the guard period used. In this example, the system design serves its purpose. As a side note, the aggressor DL signal does undergo attenuation, but still may be very high relative to the received victim UL signal due to e.g., differences in transmit powers in WDs and network nodes, as well as, propagation condition differences for network node-to-network node links and terminal/WD-to-network node links.

It is noted that the terminology victim and aggressor is only used here to illustrate why typical TDD systems are designed as they are. The victim can also act as an aggressor and vice versa and even simultaneously since channel reciprocity can exist between the network nodes.

NR Frame Structure

The radio access technology (RAT) next generation (NG) mobile wireless communication system (5G) also referred to as new radio (NR), can support a diverse set of use cases and a diverse set of deployment scenarios. The later includes deployment at both low frequencies (100s of MHz), similar to the RAT Long Term Evolution (LTE) today, and very high frequencies (mm waves in the tens of GHz).

Similar to LTE, NR uses Orthogonal Frequency Division Multiplexing (OFDM) in the downlink (e.g., from a network node such as for example a gNB, eNB, or base station, to a WD, such as for example a user equipment (UE)). The basic NR physical resource over an antenna port can thus be seen as a time-frequency grid as illustrated in FIG. 2, as an example, where a resource block (RB) in a 14-symbol slot is shown. A resource block may correspond to 12 contiguous subcarriers in the frequency domain. Resource blocks are numbered in the frequency domain, starting with 0 from one end of the system bandwidth. Each resource element may correspond to one OFDM subcarrier during one OFDM symbol interval.

Different subcarrier spacing values may be supported in NR. The supported subcarrier spacing values (also referred to as different numerologies) can be given by $\Delta f=(15\times 2^\alpha)$ kHz where a $\alpha\in(0, 1, 2, 3, 4)$. $\Delta f=15$ kHz is the basic (or reference) subcarrier spacing that is also used in LTE.

In the time domain, downlink and uplink transmissions in NR may be organized into equally-sized subframes of 1 millisecond (ms) each, similar to LTE. A subframe can be further divided into multiple slots of equal duration. The slot length for subcarrier spacing $\Delta f=(15\times 2^\alpha)$ kHz is $\frac{1}{2}^\alpha$ ms. There may be only one slot per subframe at $\Delta f=15$ kHz and a slot may include 14 OFDM symbols.

Downlink transmissions may be dynamically scheduled, i.e., in each slot the network node (e.g., gNB) may transmit downlink control information (DCI) about which WD data is to be transmitted to and which resource blocks in the current downlink slot the data is transmitted on. This control information is typically transmitted in the first one or two OFDM symbols in each slot in NR. The control information can be carried on the Physical Control Channel (PDCCH) and data can be carried on the Physical Downlink Shared Channel (PDSCH). A WD may first detect and decodes the PDCCH and if the PDCCH is decoded successfully, the WD then decodes the corresponding PDSCH based on the decoded control information in the PDCCH.

In addition to PDCCH and PDSCH, there are also other channels and reference signals transmitted in the downlink.

Uplink data transmissions, carried on Physical Uplink Shared Channel (PUSCH), may also be dynamically scheduled by the network node (e.g., gNB) by transmitting a DCI. In the case of TDD operation, the DCI (which is transmitted in the DL region) may indicate a scheduling offset so that the PUSCH is transmitted in a slot in the UL region.

Uplink-Downlink Configurations in TDD

In TDD, some subframes/slots are allocated for uplink transmissions and some subframes/slots are allocated for downlink transmissions. The switch between downlink and uplink occurs in the so-called special subframes (LTE) or flexible slots (NR).

In LTE, seven different uplink-downlink configurations are provided (see e.g., Table 1 below).

TABLE 1

LTE uplink-downlink configurations (from 3GPP Technical Specification (TS) 36.211, Table 4.2-2)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period and hence the number of symbols for the downlink pilot time slot (DwPTS) (downlink transmission in a special subframe) and uplink pilot time slot (UpPTS) (uplink transmission in a special subframe) in the special subframe can also be configured from a set of possible selections.

NR, on the other hand, may provide many different uplink-downlink configurations. There can be 10 to 320 slots per radio frame (where each radio frame has a duration of 10 ms) depending on subcarrier spacing. The OFDM symbols in a slot may be classified as 'downlink' (denoted 'D'), 'flexible' (denoted 'X'), or 'uplink' (denoted 'U'). A semi-static TDD UL-DL configuration may be used where the TDD configuration is Radio Resource Control (RRC) configured using the Information Element (IE) TDD-UL-DL-ConfigCommon, which is shown below:

```
TDD-UL-DL-ConfigCommon ::=          SEQUENCE {
    -- Reference SCS used to determine the time domain boundaries in the UL-DL
pattern which must be common across all subcarrier specific
    -- virtual carriers, i.e., independent of the actual subcarrier spacing using for
data transmission.
    -- Only the values 15 or 30 kHz (<6GHz), 60 or 120 kHz (>6GHz) are
applicable.
    -- Corresponds to L1 parameter 'reference-SCS' (see 3GPP TS 38.211, section
For Further Study/FFS_Section)
    referenceSubcarrierSpacing          SubcarrierSpacing
        OPTIONAL,
    -- Periodicity of the DL-UL pattern. Corresponds to L1 parameter 'DL-UL-
transmission-periodicity' (see 38.211, section FFS_Section)
    dl-UL-TransmissionPeriodicity       ENUMERATED {ms0p5,
ms0p625, ms1, ms1p25, ms2, ms2p5, ms5, ms10}
        OPTIONAL,
    -- Number of consecutive full DL slots at the beginning of each DL-UL
pattern.
    -- Corresponds to L1 parameter 'number-of-DL-slots' (see 38.211, Table 4.3.2-
```

-continued

```
1)
    nrofDownlinkSlots                       INTEGER
(0..maxNrofSlots)
                                            OPTIONAL,
    -- Number of consecutive DL symbols in the beginning of the slot following
the last full DL slot (as derived from nrofDownlinkSlots).
    -- If the field is absent or released, there is no partial-downlink slot.
    -- Corresponds to L1 parameter 'number-of-DL-symbols-common' (see
38.211, section FFS_Section).
    nrofDownlinkSymbols                     INTEGER
(0..maxNrofSymbols-1)
                                            OPTIONAL,       -- Need R
    -- Number of consecutive full UL slots at the end of each DL-UL pattern.
    -- Corresponds to L1 parameter 'number-of-UL-slots' (see 38.211, Table 4.3.2-
1)
    nrofUplinkSlots                         INTEGER
(0..maxNrofSlots)
                                            OPTIONAL,
    -- Number of consecutive UL symbols in the end of the slot preceding the first
full UL slot (as derived from nrofUplinkSlots).
    -- If the field is absent or released, there is no partial-uplink slot.
    -- Corresponds to L1 parameter 'number-of-UL-symbols-common' (see
38.211, section FFS_Section)
nrofUplinkSymbols                           INTEGER (0..maxNrofSymbols-
1)
```

Alternatively, the slot format can be dynamically indicated with a Slot Format Indicator (SFI) conveyed with DCI Format 2_0. Regardless of whether dynamic or semi-static TDD configuration is used in NR, the number of UL and DL slots, as well as, the guard period (the number of UL and DL symbols in the flexible slot(s)) may be almost arbitrarily configured within the TDD periodicity. This may allow for very flexible uplink-downlink configurations.

Atmospheric Ducting

In certain weather conditions and in certain regions of the world a ducting phenomenon can happen in the atmosphere. The appearance of the duct is dependent on for example temperature and humidity and can sometimes "channel" a signal to help the signal propagate a significantly longer distance than if the duct was not present. An atmospheric duct is a layer in which rapid decrease in the refractivity of the lower atmosphere (the troposphere) occurs. In this way, atmospheric ducts can trap the propagating signals in the ducting layer, instead of radiating out in space. Thus, much of the signal energy propagates in the ducting layer, which can act as a wave guide. Therefore, trapped signals can propagate through beyond-line-of-sight distances with relatively low path loss, sometimes even lower than in line-of-sight propagation. A ducting event is typically temporary though and can have a time duration from a couple of minutes to several hours.

Remote Interference Characteristics

Remote interference can be either symmetric or asymmetric. In a symmetric scenario, the remote interference is detectable at both nodes. In an asymmetric scenario, the remote interference is detectable at only one of the nodes. In this description, the scenarios are described in terms of two nodes. In reality a "node" can include a set of physical nodes causing interference to other nodes.

An example of an asymmetric communication scenario is shown in FIG. 3, as an example, where in a more a densely populated area (A) the node density is high. The interference can be aggregated towards a less populated area (B), crossing a river, and causing high interference. Conversely, the aggregated interference from B to A may be less pronounced (or not visible at all) due to the lower density of nodes in B.

Unfortunately, problems still exist with current remote interference mitigation schemes.

SUMMARY

Some embodiments provide methods, and apparatuses that may advantageously improve remote interference (RI) mitigation schemes, particularly in environments such as those with ducting, or other environments with high remote interference levels.

In one embodiment for example, a victim network node experiencing RI, a method includes communicating at least one message, the at least one message corresponding to a closed-loop feedback for remote interference mitigation.

In another embodiment for e.g., an aggressor network node for mitigating RI, a method includes receiving at least one message, the at least one message corresponding to a closed-loop feedback for remote interference mitigation. In some embodiments, the method includes applying a mitigation technique based on the at least one received message.

According to one aspect of the present disclosure, a method implemented in a network node is provided. The method includes determining one of at least two messages corresponding to a closed-loop feedback for remote interference mitigation, the at least two messages comprising a first message and a second message, the first message providing a positive mitigation indication and the second message providing a negative mitigation indication. The method includes transmitting the determined one of the at least two messages to another network node.

In some embodiments of this aspect, the positive mitigation indication indicates to increase the remote interference mitigation and the negative mitigation indication indicates to cease or decrease the remote interference mitigation. In some embodiments of this aspect, the at least two messages are reference signals. In some embodiments of this aspect, determining the one of the at least two messages further includes selecting at least one of the reference signals to transmit. In some embodiments of this aspect, the remote interference mitigation includes downtilting a transmit antenna radiation pattern. In some embodiments of this aspect, the remote interference mitigation includes reducing a transmission power. In some embodiments of this aspect, the remote interference mitigation includes increasing a guard period.

In some embodiments of this aspect, determining the one of the at least two messages further includes determining one of three messages, the second message providing the negative mitigation indication indicating to cease the remote interference mitigation and a third message of the three messages providing a negative mitigation indication to decrease the remote interference mitigation. In some embodiments of this aspect, the method further includes determining a level of remote interference experienced by the network node; and selecting the one of the at least two messages based on the determined level of remote interference. In some embodiments of this aspect, the one of the at least two messages indicates a weight corresponding to a level of remote interference experienced by the network node.

According to another aspect of the present disclosure, a method implemented in a network node is provided. The method includes receiving one of at least two messages corresponding to a closed-loop feedback for remote interference mitigation, the at least two messages comprising a first message and a second message, the first message providing a positive mitigation indication and the second message providing a negative mitigation indication. The method includes taking a remote interference mitigation action based on the received one of at least two messages.

In some embodiments of this aspect, the positive mitigation indication indicates to increase the remote interference mitigation and the negative mitigation indication indicates to cease or decrease the remote interference mitigation. In some embodiments of this aspect, receiving the one of the at least two messages corresponding to the closed-loop feedback for the remote interference mitigation further includes receiving one of at least two reference signals corresponding to the closed-loop feedback. In some embodiments of this aspect, the remote interference mitigation includes downtilting a transmit antenna radiation pattern. In some embodiments of this aspect, the remote interference mitigation includes reducing a transmission power. In some embodiments of this aspect, the remote interference mitigation includes increasing a guard period.

In some embodiments of this aspect, receiving the one of the at least two messages further includes receiving one of three messages, the second message providing the negative mitigation indication indicating to cease the remote interference mitigation and a third message of the three messages providing a negative mitigation indication to decrease the remote interference mitigation. In some embodiments of this aspect, the one of the at least two messages includes an indication of a level of remote interference to be mitigated by the network node. In some embodiments of this aspect, the one of the at least two messages indicates a weight corresponding to a level of remote interference to be mitigated by the network node. In some embodiments of this aspect, taking the remote interference mitigation action based on the received one of at least two messages further includes selecting and applying a mitigation technique based on the received one of at least two messages. In some embodiments of this aspect, taking the remote interference mitigation action based on the received one of at least two messages further includes determining which mitigation technique to apply if a plurality of contradictory messages are received, the determination based at least in part on at least one of a majority rule, a weighted message, and an interference level indicated in the one of the at least two messages.

According to another aspect of the present disclosure, a network node configured to communicate with a wireless device, WD, is provided. The network node includes processing circuitry. The processing circuitry is configured to cause the network node to determine one of at least two messages corresponding to a closed-loop feedback for remote interference mitigation, the at least two messages comprising a first message and a second message, the first message providing a positive mitigation indication and the second message providing a negative mitigation indication. The processing circuitry is configured to cause the network node to transmit the determined one of the at least two messages to another network node.

In some embodiments of this aspect, the positive mitigation indication indicates to increase the remote interference mitigation and the negative mitigation indication indicates to cease or decrease the remote interference mitigation. In some embodiments of this aspect, the at least two messages are reference signals. In some embodiments of this aspect, the processing circuitry is further configured to cause the network node to determine the one of the at least two messages by being configured to cause the network node to select at least one of the reference signals to transmit. In some embodiments of this aspect, the remote interference mitigation comprises at least one of: downtilting a transmit antenna radiation pattern; reducing a transmission power; and increasing a guard period.

In some embodiments of this aspect, the processing circuitry is further configured to cause the network node to determine the one of the at least two messages by being configured to cause the network node to determine one of three messages, the second message providing the negative mitigation indication indicating to cease the remote interference mitigation and a third message of the three messages providing a negative mitigation indication to decrease the remote interference mitigation. In some embodiments of this aspect, the processing circuitry is further configured to cause the network node to determine a level of remote interference experienced by the network node; and select the one of the at least two messages based on the determined level of remote interference. In some embodiments of this aspect, the one of the at least two messages indicates a weight corresponding to a level of remote interference experienced by the network node.

According to yet another aspect of the present disclosure, a network node configured to communicate with a wireless device, WD, is provided. The network node includes processing circuitry. The processing circuitry is configured to cause the network node to receive one of at least two messages corresponding to a closed-loop feedback for remote interference mitigation, the at least two messages comprising a first message and a second message, the first message providing a positive mitigation indication and the second message providing a negative mitigation indication. The processing circuitry is configured to cause the network node to take a remote interference mitigation action based on the received one of at least two messages.

In some embodiments of this aspect, the positive mitigation indication indicates to increase the remote interference mitigation and the negative mitigation indication indicates to cease or decrease the remote interference mitigation. In some embodiments of this aspect, the processing circuitry is further configured to cause the network node to receive the one of the at least two messages corresponding to the closed-loop feedback for the remote interference mitigation by being configured to cause the network node to receive one of at least two reference signals corresponding to the closed-loop feedback. In some embodiments of this aspect, the remote interference mitigation comprises at least one of: downtilting a transmit antenna radiation pattern; reducing a transmission power; and increasing a guard period.

In some embodiments of this aspect, the processing circuitry is further configured to cause the network node to receive the one of the at least two messages by being configured to cause the network node to receive one of three messages, the second message providing the negative mitigation indication indicating to cease the remote interference mitigation and a third message of the three messages providing a negative mitigation indication to decrease the remote interference mitigation. In some embodiments of this aspect, the one of the at least two messages includes an indication of a level of remote interference to be mitigated by the network node. In some embodiments of this aspect, the one of the at least two messages indicates a weight corresponding to a level of remote interference to be mitigated by the network node. In some embodiments of this aspect, the processing circuitry is further configured to cause the network node to take the remote interference mitigation action based on the received one of the at least two messages by being configured to cause the network node to select and apply a mitigation technique based on the received one of at least two messages. In some embodiments of this aspect, the processing circuitry is further configured to cause the network node to take the remote interference mitigation action based on the received one of the at least two messages by being configured to cause the network node to determine which mitigation technique to apply if a plurality of contradictory messages are received, the determination based at least in part on at least one of a majority rule, a weighted message, and an interference level indicated in the one of the at least two messages.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for executing a client application at a wireless device according to some embodiments of the present disclosure;

FIG. 8 is a flowchart illustrating exemplary methods implemented in a communication system including a host computer, a network node and a wireless device for receiving user data at a wireless device according to some embodiments of the present disclosure;

DETAILED DESCRIPTION

Remote Interference Management (RIM)

Figure 1:
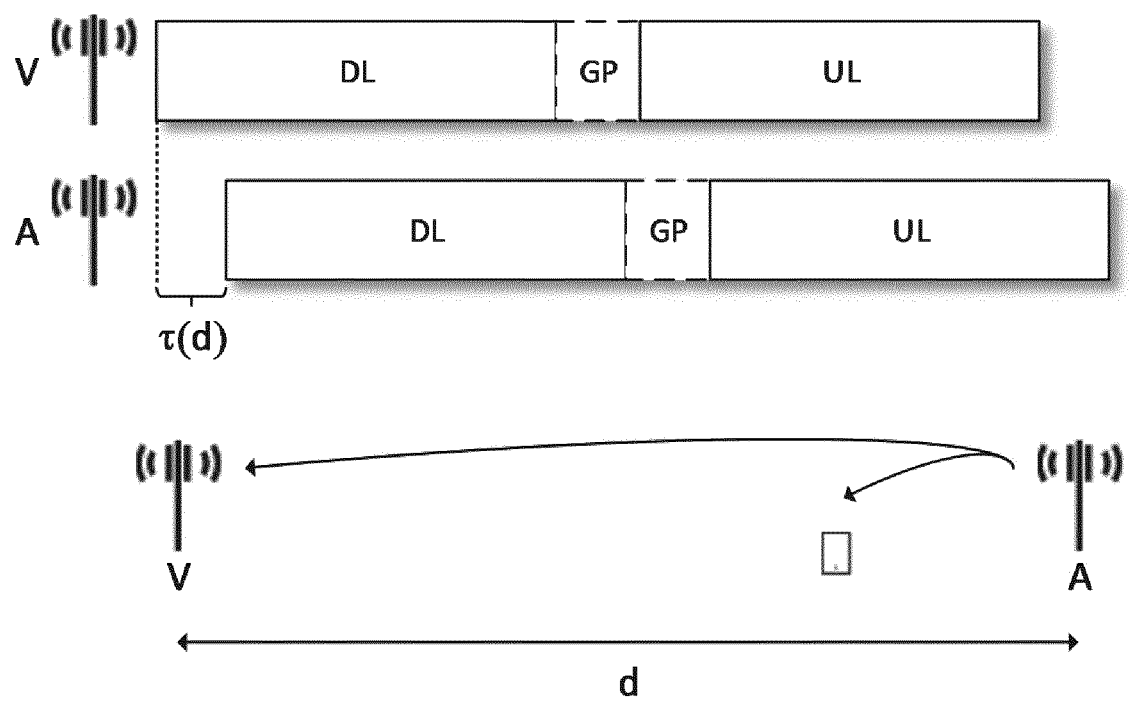
FIG. 1 illustrates a TDD guard period design.
Figure 2:
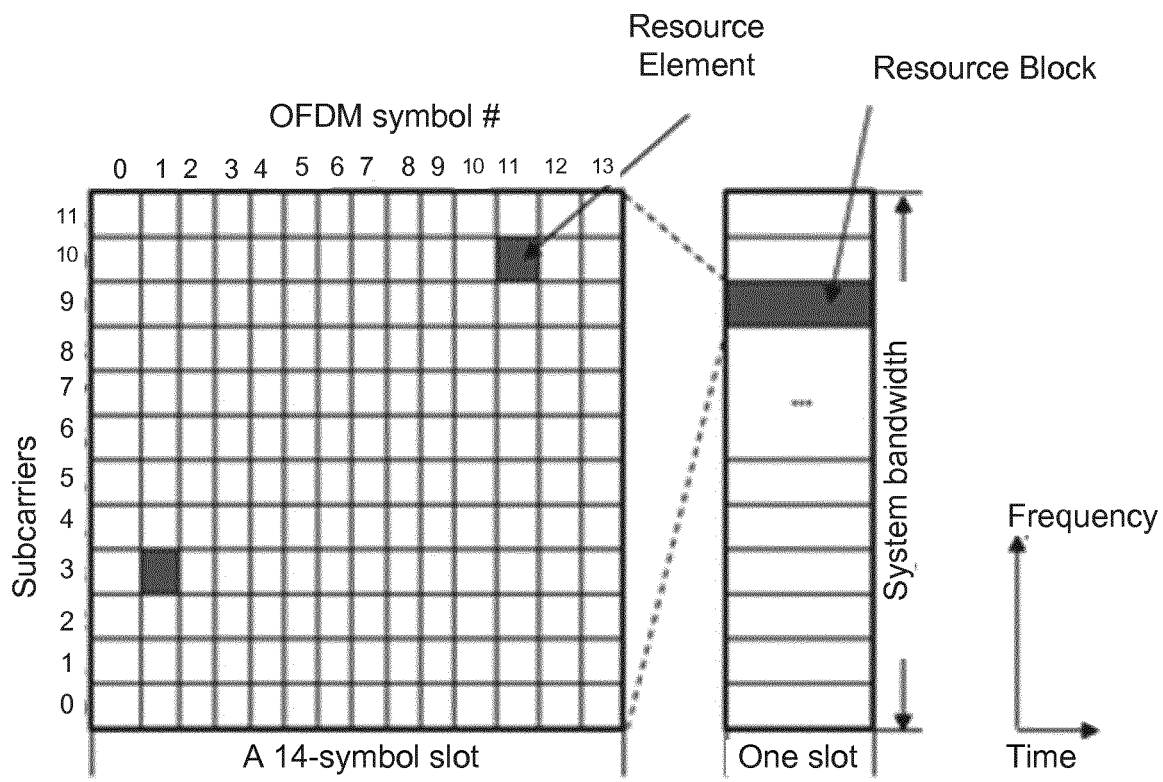
FIG. 2 illustrates an example NR physical resource grid.
Figure 3:
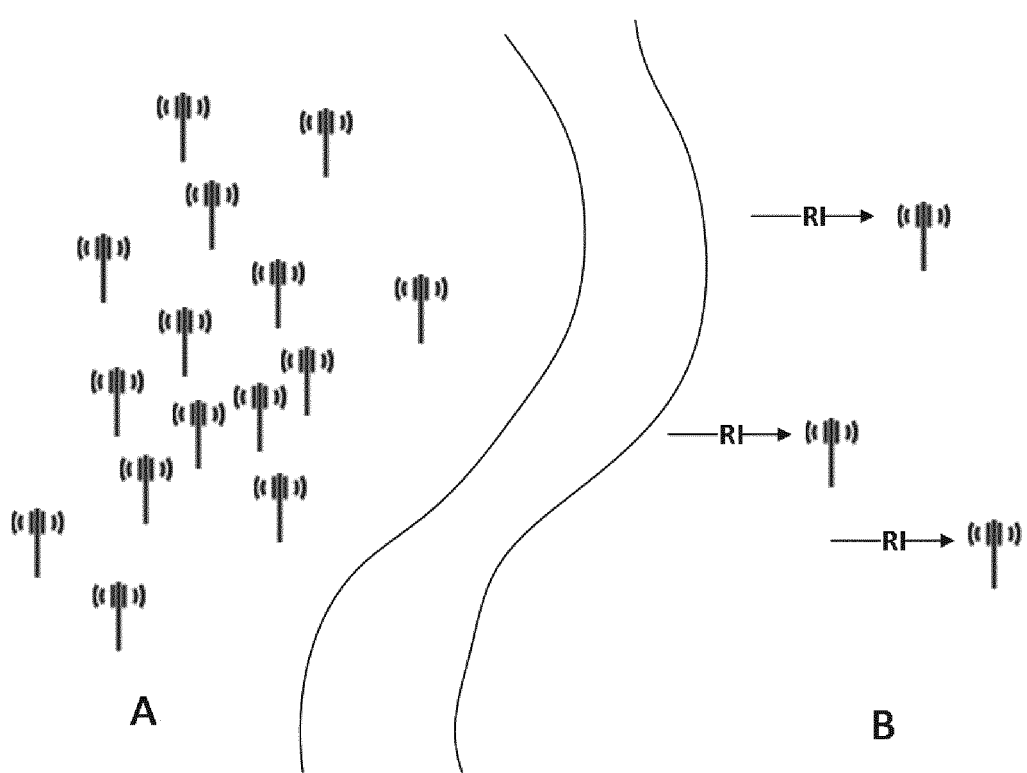
FIG. 3 illustrates an asymmetric interference scenario.

To mitigate DL-to-UL interference occurring due to e.g., ducting events in TDD macro deployments (so-called remote interference), several mechanisms may be used. For instance, the aggressor network node may increase its GP (and thereby reduce the number of DL symbols in its cell). While this can reduce DL capacity in the aggressor cell, it may reduce the UL interference level in the victim cell and therefore be beneficial to the overall network performance. As such a measure mutes resources in one cell to protect resources in another cell. These mechanisms should only be applied when the remote network node aggressor is actually causing interference to the victim, e.g., when a tropospheric ducting event occurs. Thus, the (potential) aggressor network node should be made aware that it is causing interference to a (potential) victim network node in order to know when to apply the remote interference mitigation mechanism.

In some proposed remote interference mitigation schemes, the victim of remote interference transmits a reference signal (RS) in certain time locations in order to make the aggressor(s) aware that they are causing interference to the victim. Since the propagation channel is reciprocal in TDD systems, the aggressor would receive the RS at the same signal strength as the victim receives the aggressor's interfering signal (assuming that is that the same transmitter (TX) power and TX/RX antenna patterns are used for both transmissions). A potential aggressor network node could then monitor certain time locations for RSs transmitted by potential victims, and upon detection of an RS sequence the aggressor node would infer that it is causing remote interference to a certain victim network node. The aggressor may then apply a remote interference mitigation mechanism.

Such an RS may be transmitted by the victim at the end of the DL region (right before the GP) and the potential aggressor monitors the start of the UL region (right after the GP) for such transmitted RSs.

After receiving the RS from the victim, the aggressor causing the remote interference can transmit an RS to assist the victim in knowing that the interference situation is still ongoing Since the aggressor can apply a mitigation scheme to avoid interfering with the victim, the victim might no longer see remote interference and hence should assist the aggressor node to understand if the problem still exists or not.

These RSs can be referred to as RS-1 and RS-2, respectively:

RS-1: Transmitted from victim to aggressor to indicate that remote interference has been detected. RS-1 can be transmitted as long as the ducting phenomenon is present. This indicates to the receiving aggressor that even if it has applied a mitigation scheme based on RS-1 reception already, the atmospheric duct is still present.

RS-2: Transmitted from aggressor to victim to indicate that the atmospheric duct is present (as long as RS-2 can be received by the victim). The RS-2 transmission can be triggered by the RS-1 reception from the victim. The reception of RS-2 by the victim indicates that the victim should continue to transmit RS-1 to indicate to the aggressor that it should continue applying a RIM mitigation scheme. When RS-2 is no longer received, the victim can conclude that the duct is no longer present and can stop transmitting RS-1.

Whether RS-1 and RS-2 should be the same sequences transmitted from a given node may be considered. Allowing RS-1 and RS-2 to be different could prevent a victim from applying mitigation schemes if not being an aggressor. Furthermore, if it is agreed that RS-1 and RS-2 should be different, it may be considered whether both RS-1 and RS-2 are to be transmitted, or just one of RS-1 and RS-2 from a given node.

Figure 4:
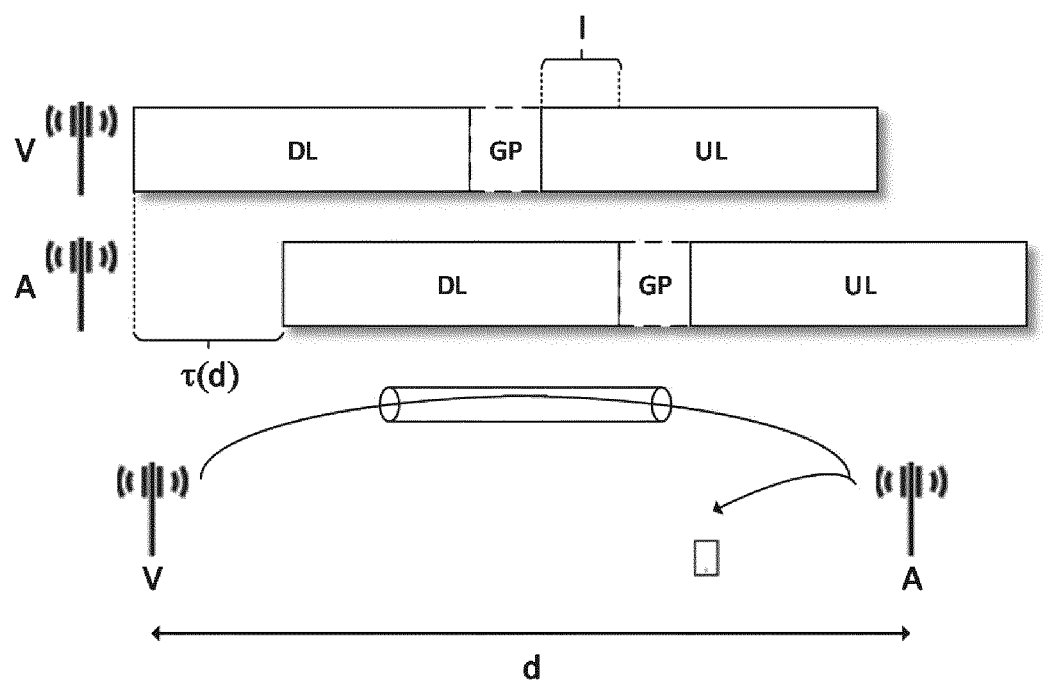
FIG. 4 illustrates DL interference into an UL region.

Combining the knowledge of the TDD system design and the presence of an atmospheric duct, the distance d shown in FIG. 1 (where an aggressor network node can interfere with a victim network node) can be greatly increased, as shown in FIG. 4. Since the phenomenon has only appeared in certain parts of the world and/or under certain conditions, this has typically not been greatly considered in the design of cellular systems using the unpaired spectrum. However, the implication is that a DL transmission can suddenly enter the UL region as interference (I), which is illustrated in FIG. 4, as an example. FIG. 4 illustrates a single radio link, but when the atmospheric ducting occurs, a network node can be interfered by thousands of network nodes. The closer the aggressor the shorter the propagation delay, and the stronger the interference. In addition, the reference signal(s) transmitted can either be sent by an aggressor, victim or both.

In some embodiments, backhaul signaling between the nodes (e.g., gNBs) may be used for remote interference mitigation (RIM), instead of or in addition to the network nodes sending the reference signals e.g., RS-1 and RS-2 discussed above. That is, as long as a network node (e.g., gNB) can be identified (through the RS reception), a backhaul connection can be established. A victim node can then provide information to the aggressor node about radio related information to further fine-tune the aggressor's mitigation. Radio related information can however be sensitive to transmissions between network nodes (e.g., gNBs) in different core network nodes. Furthermore, using backhaul signaling may result in additional complexity in implementation.

Some embodiments of this disclosure provide for establishing a closed-loop feedback between network nodes (e.g., gNBs) involved in remote interference mitigation. In some embodiments, the feedback allows a victim to inform the aggressor about relative changes occurring in the radio conditions in order to reduce the impact on the receiver due to remote interference.

In some embodiments, the closed-loop procedure may be achieved without involvement of backhaul signaling (although backhaul signaling could be part of it) and/or can be achieved by implementation (associated with RIM feature components in the network).

Advantages of some embodiments of this disclosure may include more refined remote interference mitigation schemes, as compared to existing RIM schemes, by realizing a closed-loop-based feedback on radio related parameters for RIM. This can advantageously enable an aggressor to adopt an appropriate level of remote interference mitigation based on the feedback from the victim, implying that resources in the aggressor cell can be saved.

Before describing in detail exemplary embodiments, it is noted that the embodiments reside primarily in combinations of apparatus components and processing steps related to a closed-loop RIM framework. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term time resource used herein may correspond to any type of physical resource or radio resource expressed in terms of length of time. Examples of time resources are: symbol, time slot, subframe, radio frame, transmission time interval (TTI), interleaving time, etc.

The term radio access technology, or RAT, may refer to any RAT e.g., Universal Terrestrial Radio Access (UTRA), Evolved-UTRA (E-UTRA), narrow band internet of things (NB-IoT), WiFi, Bluetooth, next generation RAT (NR), 4G, 5G, etc. Any of the first and the second nodes may be capable of supporting a single or multiple RATs.

The term reference signal used herein can be any physical signal or physical channel. Examples of downlink reference signals are primary synchronization signal (PSS), secondary synchronization signal (SSS), cell-specific reference signal (CRS), positioning reference signal (PRS), channel state information reference signal (CSI-RS), demodulation reference signal (DMRS), narrowband reference signal (NRS), narrowband PSS (NPSS), narrowband SSS (NSSS), synchronization signal (SS), multicast-broadcast single frequency network (MBSFN) reference signal (RS), RIM RS, etc. Examples of uplink reference signals are sounding reference signal (SRS), demodulation reference signal (DMRS), etc.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver.

Any two or more embodiments described in this disclosure may be combined in any way with each other. The term "resource" may be used herein and may be intended to be interpreted in a general way. It may indicate an arbitrary combination of subcarriers, time slots, codes and spatial dimensions. The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, information, such as RI information as described herein, on one or more resources may be considered to be transmitted in a message having a specific format. A message may comprise or represent bits representing payload information and coding bits, e.g., for error coding.

Receiving (or obtaining) information, such as RI information as described herein, may comprise receiving one or more information messages. It may be considered that receiving signaling comprises demodulating and/or decoding and/or detecting, e.g. blind detection of, one or more messages, in particular a message carried by e.g., control signaling, e.g. based on an assumed set of resources, which may be searched and/or listened for the information. It may be assumed that both sides of the communication are aware of the configurations, and may determine the set of resources.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of an RI level and/or a weight, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Note that although terminology from one particular wireless system, such as, for example, 3$^{rd}$ Generation Partnership Project (3GPP) LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
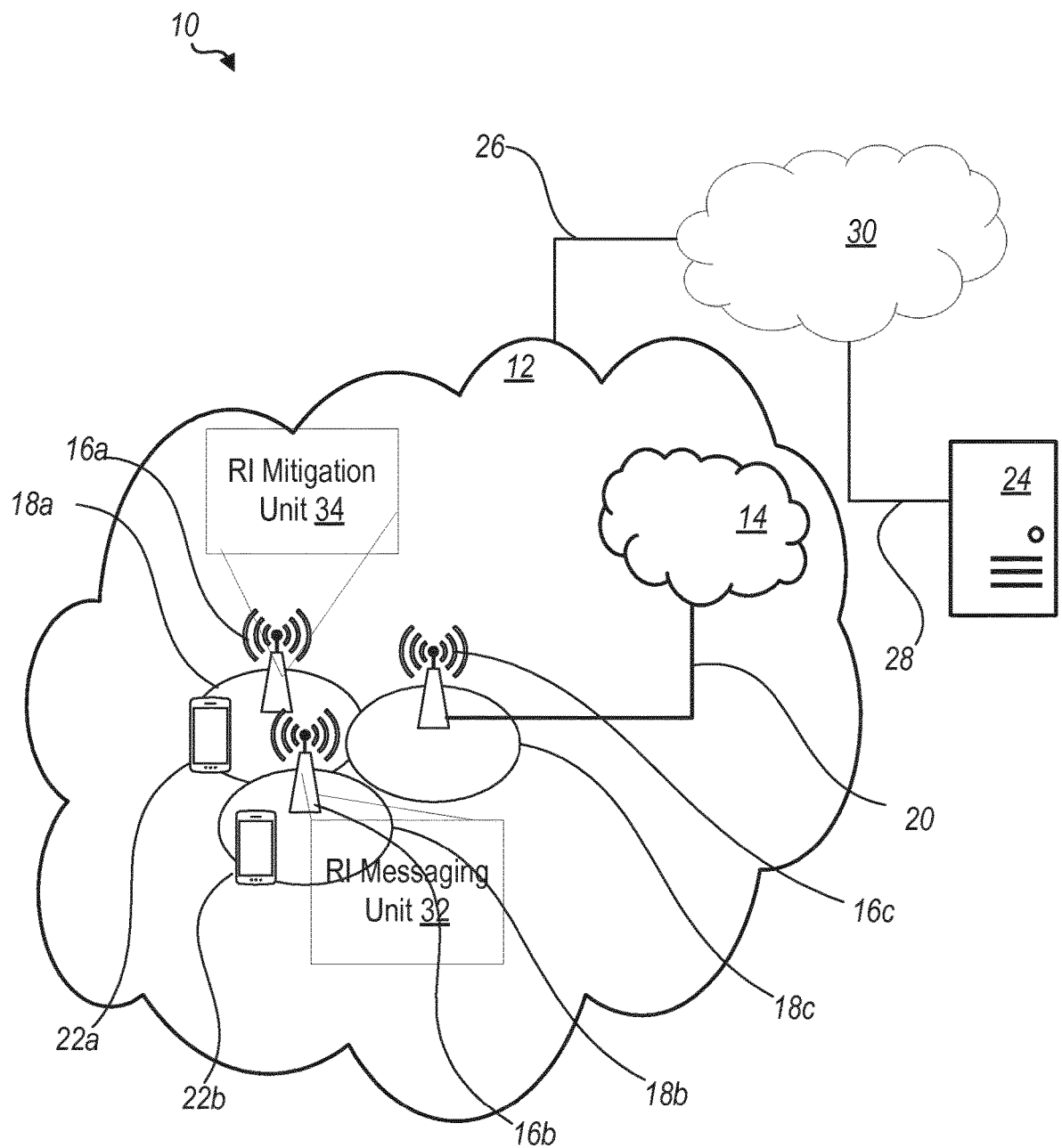
FIG. 5 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

In some embodiments, the network node 16a described herein may be referred to as an aggressor network node and the network node 16b may be referred to as a victim node. Such terminology is for illustrative purposes. However, it should be understood that in practice a network node may be an aggressor node at times and a victim node at other times, or simultaneously, an aggressor node towards another node and a victim node of yet another node. Thus, in some embodiments, a network node may include both an RI messaging unit configured for a victim node process according to this disclosure and an RI mitigation unit configured for an aggressor node process according to this disclosure.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16b is configured to include an RI messaging unit 32 which is configured to communicate at least one message, the at least one message corresponding to a closed-loop feedback for remote interference mitigation. In some embodiments, the RI messaging unit 32 is configured to determine one of at least two messages corresponding to a closed-loop feedback for remote interference mitigation, the at least two messages comprising a first message and a second message, the first message providing a positive mitigation indication and the second message providing a negative mitigation indication; and transmit the determined one of the at least two messages to another network node.

A network node 16a is configured to include a RI mitigation unit 34 which is configured to receive at least one message, the at least one message corresponding to a closed-loop feedback for remote interference mitigation. In some embodiments, the RI mitigation unit 34 is configured to receive one of at least two messages corresponding to a closed-loop feedback for remote interference mitigation, the at least two messages comprising a first message and a second message, the first message providing a positive mitigation indication and the second message providing a negative mitigation indication; and take a remote interference mitigation action based on the received one of at least two messages.

In some embodiments, a network node 16 may include both the RI mitigation unit 34 as well as the RI messaging unit 32.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16, such as the processes described with reference to FIGS. 11 and 12. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an RI messaging unit 32 configured to communicate at least one message, the at least one message corresponding to a closed-loop feedback for remote interference mitigation.

In some embodiments, the processing circuitry 68 is further configured to communicate the at least one message by being configured to communicate at least two messages, a first message of the at least two messages providing a positive mitigation indication to increase the remote interference mitigation and a second message of the at least two messages providing a negative mitigation indication to cease or decrease the remote interference mitigation. In some embodiments, the processing circuitry 68 is further configured to determine a level of remote interference experienced by the network node 16 and select one of the at least one message to communicate based on the determined level of remote interference. In some embodiments, the at least one message indicates a weight corresponding to a level of remote interference experienced by the network node 16.

In some embodiments, the processing circuitry 68 may include an RI mitigation unit 34 configured to receive at least one message, the at least one message corresponding to a closed-loop feedback for remote interference mitigation. In some embodiments, the received at least one message is one of at least two messages, a first message of the at least two messages providing a positive mitigation indication to increase the remote interference mitigation being applied by the network node 16 and a second message of the at least two messages providing a negative mitigation indication to cease or decrease the remote interference mitigation being applied by the network node 16. In some embodiments, the at least one message includes an indication of a level of remote interference to be mitigated by the network node 16. In some embodiments, the at least one message a weight corresponding to a level of remote interference to be mitigated by the network node 16. In some embodiments, the processing circuitry 68 is further configured to select and apply a mitigation technique based on the received at least one message. In some embodiments, the processing circuitry 68 is further configured to determine which mitigation technique to apply if a plurality of contradictory messages are received, the determination based on at least one of a majority rule, a weighted message, and an interference level indicated in the at least one received message.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may be configured to receive DL communications from the network node 16 and/or communicate UL communications to the network node 16.

Figure 6:
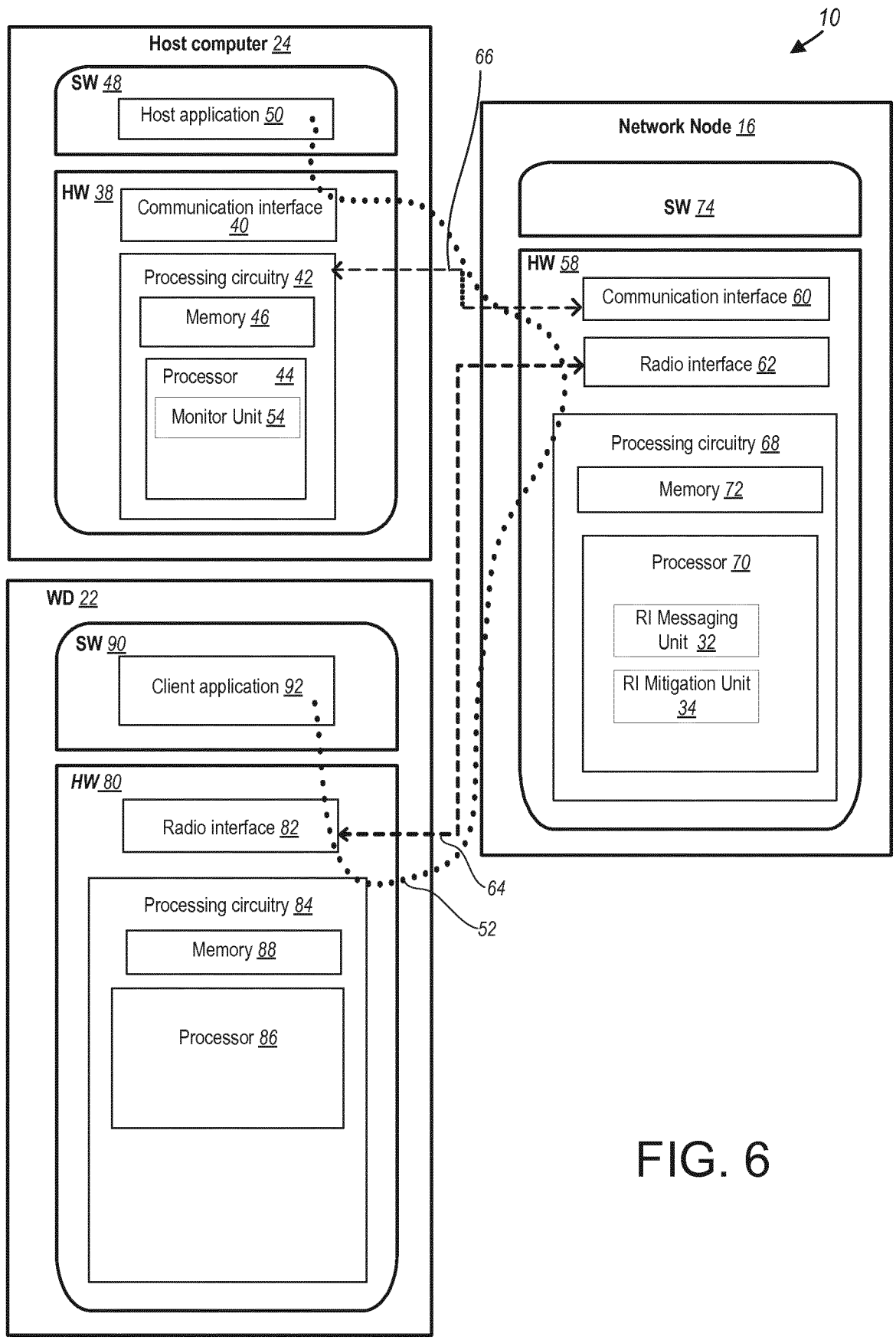
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as RI messaging unit 32, and RI mitigation unit 34 as being within a processor, it is contemplated that these units may be implemented such that a portion of the unit is stored in a corresponding memory within the processing circuitry. In other words, the units may be implemented in hardware or in a combination of hardware and software within the processing circuitry. One of the units 32 or 34 may be implemented by processing circuitry in some embodiments. In other embodiments, both units 32 and 34 may be implemented by processing circuitry, since a network node can be both an aggressor and a victim in an RI context.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 9:
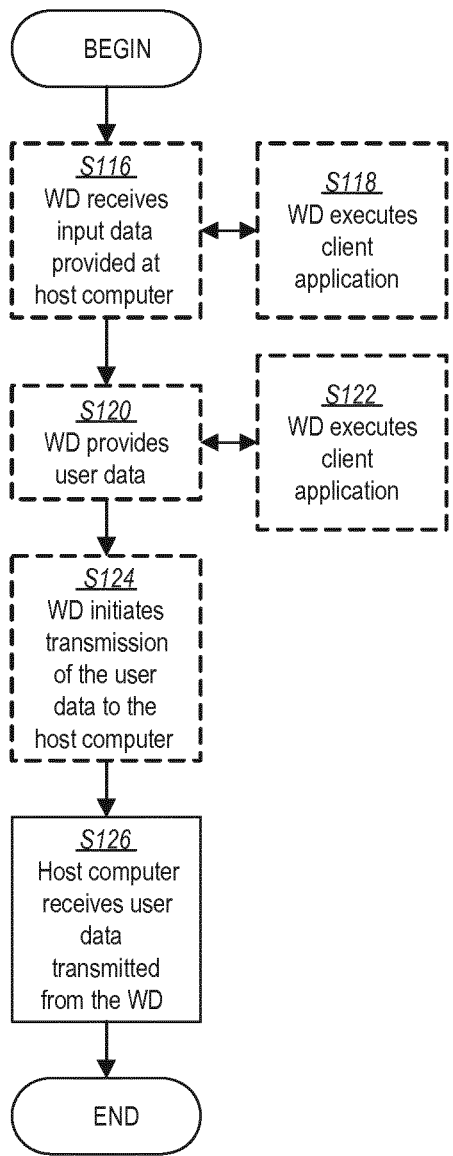
FIG. 9 is a flowchart illustrating exemplary methods implemented in a communication system including a host computer, a network node and a wireless device for receiving user data from the wireless device at a host computer according to some embodiments of the present disclosure.

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 10:
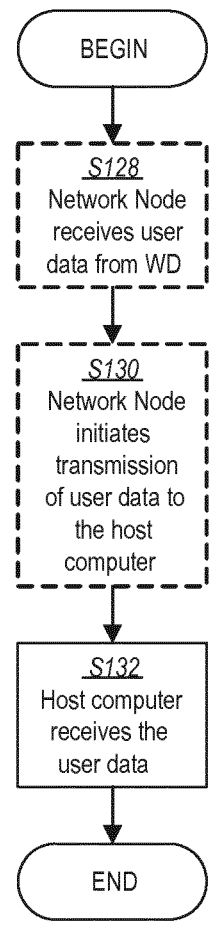
FIG. 10 is a flowchart illustrating exemplary methods implemented in a communication system including a host computer, a network node and a wireless device for receiving user data at a host computer according to some embodiments of the present disclosure.

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
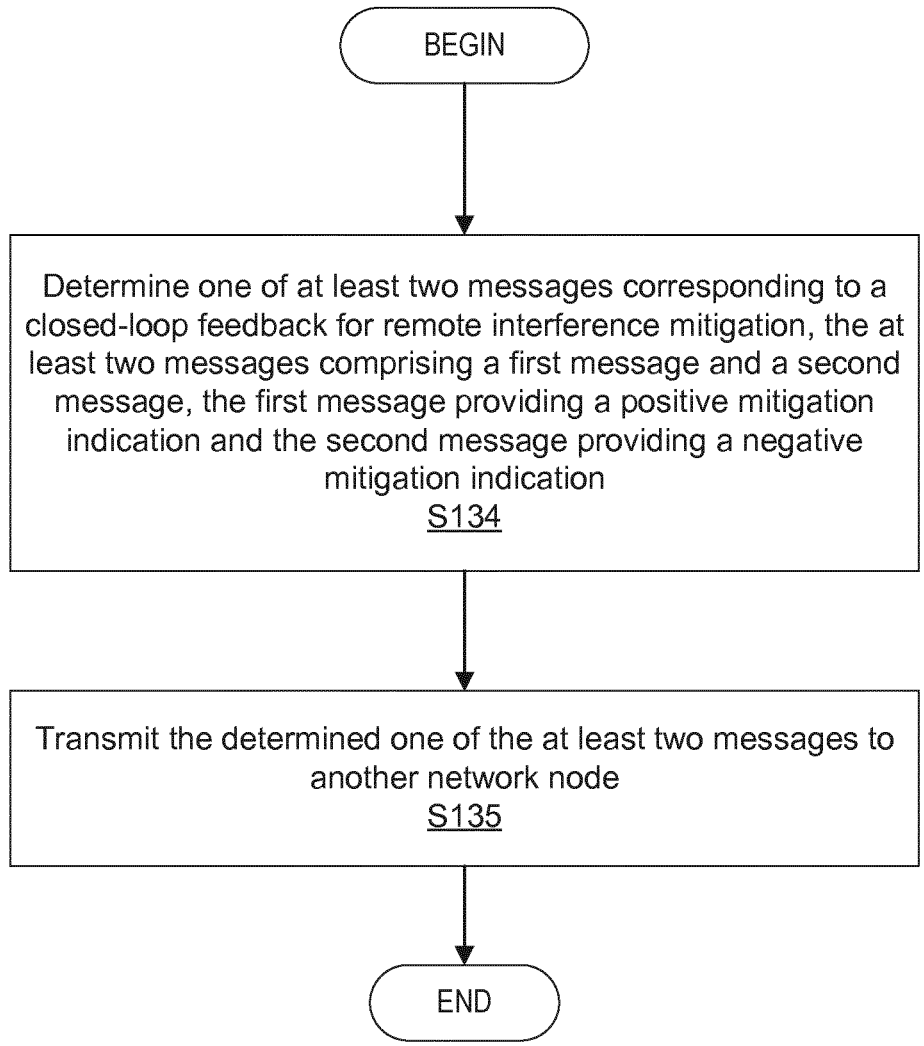
FIG. 11 is a flowchart of an exemplary process in a network node for RI messaging unit according to some embodiments of the present disclosure.

FIG. 11 is a flowchart of an exemplary process in a network node 16 (e.g., network node 16b) for implementing a victim node process according to some embodiments of this disclosure. One or more Blocks and/or functions and/or methods performed by the network node 16 may be performed by one or more elements of network node 16 such as by RI messaging unit 32 in processing circuitry 68, processor 70, communication interface 60 and/or radio interface 62, etc. according to the example method. The example method includes determining (Block S134), such as via RI messaging unit 32, processing circuitry 68, processor 70, communication interface 60 and/or radio interface 62, one of at least two messages corresponding to a closed-loop feedback for remote interference mitigation, the at least two messages comprising a first message and a second message, the first message providing a positive mitigation indication and the second message providing a negative mitigation indication. The method includes transmitting (Block S135), such as via RI messaging unit 32, processing circuitry 68, processor 70, communication interface 60 and/or radio interface 62, the determined one of the at least two messages to another network node.

In some embodiments, the positive mitigation indication indicates to increase the remote interference mitigation and the negative mitigation indication indicates to cease or decrease the remote interference mitigation. In some embodiments, the at least two messages are reference signals. In some embodiments, determining the one of the at least two messages further includes selecting, such as via RI messaging unit 32, processing circuitry 68, processor 70, communication interface 60 and/or radio interface 62, at least one of the reference signals to transmit. In some embodiments, the remote interference mitigation includes at least one of: downtilting a transmit antenna radiation pattern; reducing a transmission power; and increasing a guard period. In some embodiments, determining the one of the at least two messages further includes determining, such as via RI messaging unit 32, processing circuitry 68, processor 70, communication interface 60 and/or radio interface 62, one of three messages, the second message providing the negative mitigation indication indicating to cease the remote interference mitigation and a third message of the three messages providing a negative mitigation indication to decrease the remote interference mitigation.

In some embodiments, the method includes determining, such as via RI messaging unit 32, processing circuitry 68, processor 70, communication interface 60 and/or radio interface 62, a level of remote interference experienced by the network node 16; and selecting, such as via RI messaging unit 32, processing circuitry 68, processor 70, communication interface 60 and/or radio interface 62, the one of the at least two messages based on the determined level of remote interference. In some embodiments, the one of the at least two messages indicates a weight corresponding to a level of remote interference experienced by the network node 16.

In some embodiments, the method includes determining, such as for example via IR messaging unit in processing circuitry 68, at least one message, the at least one message corresponding to a closed-loop feedback for remote interference mitigation. The method optionally includes transmitting the at least one message using radio interface 62 or another communication interface such as communication interface 60. In some embodiments, the communicating the at least one message further comprises determining one of at least two messages, a first message of the at least two messages providing a positive mitigation indication to increase the remote interference mitigation and a second message of the at least two messages providing a negative mitigation indication to cease or decrease the remote interference mitigation. In some embodiments, the determined message is one of three messages, wherein the second message provides a negative mitigation indication to cease the remote interference mitigation and a third message provides a negative mitigation indication decrease the remote interference mitigation.

In some embodiments, the method further includes determining, such as via RI messaging unit, a level of remote interference experienced by the network node 16b and selecting one of the at least one message to communicate based on the determined level of remote interference. In some embodiments, the at least one message indicates a weight corresponding to a level of remote interference experienced by the network node 16b.

Figure 12:
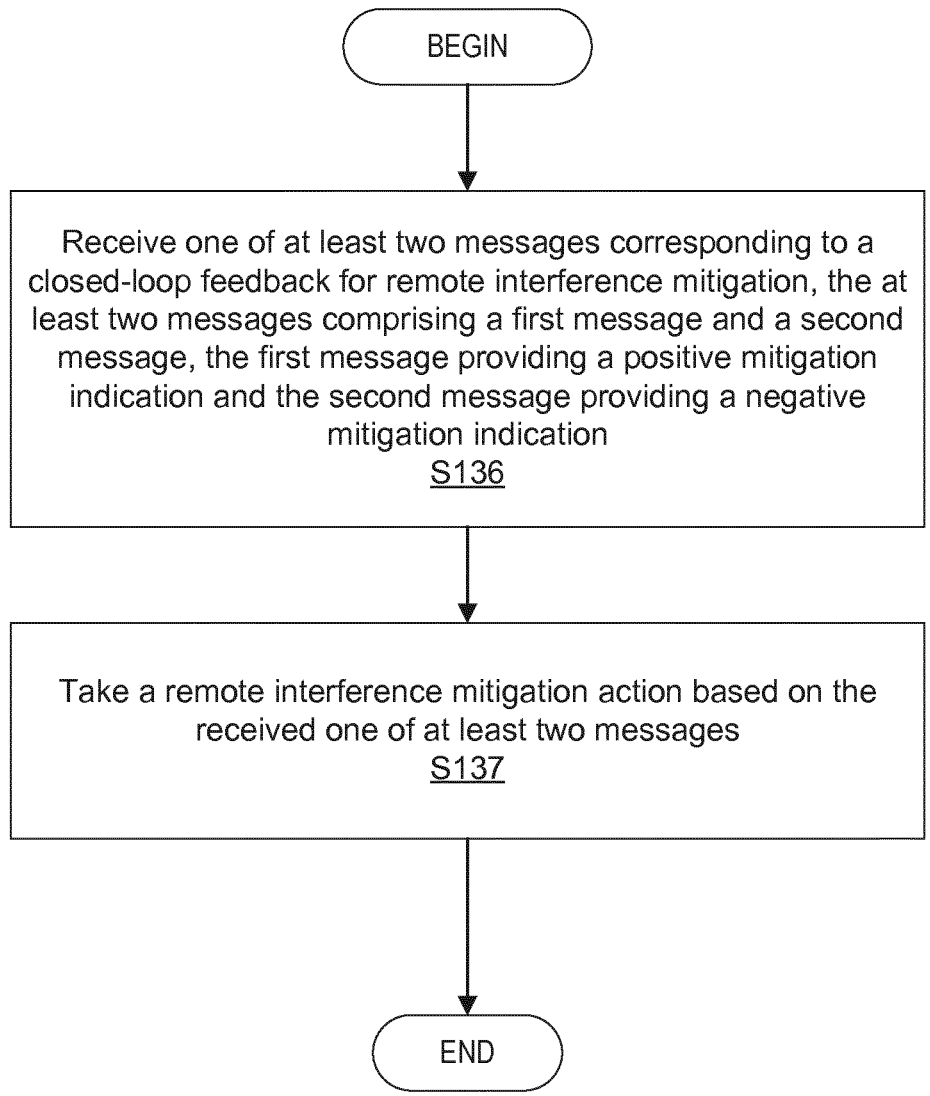
FIG. 12 is a flowchart of an exemplary process in a wireless device for RI mitigation unit according to some embodiments of the present disclosure.

FIG. 12 is a flowchart of an exemplary process in a network node 16 (e.g., network node 16a) for implementing an aggressor node process according to some embodiments of the present disclosure. One or more Blocks and/or functions and/or methods performed by the network node 16 may be performed by one or more elements of network node 16 such as by RI mitigation unit 34 in processing circuitry 68, processor 70, communication interface 60 and/or radio interface 62, etc. according to the example method. The example method includes receiving (Block S136), such as via RI mitigation unit 34, processing circuitry 68, processor 70, communication interface 60 and/or radio interface 62, one of at least two messages corresponding to a closed-loop feedback for remote interference mitigation, the at least two messages comprising a first message and a second message, the first message providing a positive mitigation indication and the second message providing a negative mitigation indication. The method includes taking (Block S137), such as via RI mitigation unit 34, processing circuitry 68, processor 70, communication interface 60 and/or radio interface 62, a remote interference mitigation action based on the received one of at least two messages.

In some embodiments, the positive mitigation indication indicates to increase the remote interference mitigation and the negative mitigation indication indicates to cease or decrease the remote interference mitigation. In some embodiments, receiving the one of the at least two messages corresponding to the closed-loop feedback for the remote interference mitigation further includes receiving, such as via RI mitigation unit 34, processing circuitry 68, processor 70, communication interface 60 and/or radio interface 62, one of at least two reference signals corresponding to the closed-loop feedback. In some embodiments, the remote interference mitigation includes at least one of: downtilting a transmit antenna radiation pattern; reducing a transmission power; and increasing a guard period. In some embodiments, receiving the one of the at least two messages further includes receiving, such as via RI mitigation unit 34, processing circuitry 68, processor 70, communication interface 60 and/or radio interface 62, one of three messages, the second message providing the negative mitigation indication indicating to cease the remote interference mitigation and a third message of the three messages providing a negative mitigation indication to decrease the remote interference mitigation.

In some embodiments, the one of the at least two messages includes an indication of a level of remote interference to be mitigated by the network node 16. In some embodiments, the one of the at least two messages indicates a weight corresponding to a level of remote interference to be mitigated by the network node 16. In some embodiments, taking the remote interference mitigation action based on the received one of at least two messages further includes selecting and applying, such as via RI mitigation unit 34, processing circuitry 68, processor 70, communication interface 60 and/or radio interface 62, a mitigation technique based on the received one of at least two messages. In some embodiments, taking the remote interference mitigation action based on the received one of at least two messages further includes determining, such as via RI mitigation unit 34, processing circuitry 68, processor 70, communication interface 60 and/or radio interface 62, which mitigation technique to apply if a plurality of contradictory messages are received, the determination based at least in part on at least one of a majority rule, a weighted message, and an interference level indicated in the one of the at least two messages.

In some embodiments, the method includes receiving (Block S136), such as via radio interface 62 or another communication interface such as communication interface 60, at least one message, the at least one message corresponding to a closed-loop feedback for remote interference mitigation. The method further includes taking a mitigation action (Block S137), such as for example via the RI mitigation unit 34 in processing circuitry 68, based on the received at least one message. In some embodiments, the received at least one message is one of at least two messages, a first message of the at least two messages providing a positive mitigation indication to increase the remote interference mitigation being applied by the network node 16a and a second message of the at least two messages providing a negative mitigation indication to cease or decrease the remote interference mitigation being applied by the network node 16a. In some embodiments, the received message is one of three messages, wherein the second message provides a negative mitigation indication to cease the remote interference mitigation being applied by the network node and a third message provides a negative mitigation indication decrease the remote interference mitigation being applied by the network node.

In some embodiments, the at least one message includes an indication of a level of remote interference to be mitigated by the network node 16a. In some embodiments, the at least one message indicates a weight corresponding to a level of remote interference to be mitigated by the network node 16a. In some embodiments, taking a mitigation action includes selecting and applying a mitigation technique, such as for example via RI mitigation unit 34, based on the received at least one message. In some embodiments, taking a mitigation action includes determining which mitigation technique to apply, such as for example via RI mitigation unit 34, if a plurality of contradictory messages are received, the determination based at least in part on at least one of a majority rule, a weighted message, and an interference level indicated in the at least one received message.

Having generally described some embodiments for a closed-loop RIM framework, a more detailed description of some of the embodiments are described below and which may be implemented by the network node 16, wireless device 22 and/or host computer 24.

In some embodiments, remote interference mitigation techniques that an aggressor node (e.g., network node 16a) can apply in order to reduce the interference caused to one or more victim nodes (e.g., network node 16b) include the following:

Spatial domain techniques, by for instance downtilting the transmit antenna radiation pattern so that less interference can be transmitted in the direction of the victims, at the cost of reducing cell edge performance and/or coverage in the aggressor cell.

Power domain techniques, such as reducing the transmission power in the aggressor cell, thereby causing less interference to victim nodes, but also reducing the performance in the aggressor cell.

Time domain techniques, such as increasing the guard period in the aggressor cell so as to blank DL symbols in the special slot. Again, more blanked symbols generally means less interference caused but also fewer resources available in the aggressor's own cell.

In some embodiments, all of these mitigation techniques can be characterized by being gradual (e.g., the antenna pattern can be downtilted X degrees, the power level can be reduced by X dB, X number of downlink symbols can be blanked, etc.). In some embodiments, the mitigation techniques may be performed gradually since there may be an associated cost in the aggressor cell by applying them. Thus, it may be beneficial to apply just the right degree of mitigation so that no unnecessary resources in the aggressor cell are sacrificed. The techniques in this disclosure may allow for this.

Thus, some embodiments of this disclosure provide for a "closed-loop" over-the-air message passing system between nodes (e.g., network node 16a and network node 16b) experiencing and/or causing remote interference.

In one embodiment, a number of messages, m1, . . . , mN, may be defined, determined and transmitted over-the-air between nodes (e.g., network node 16a and network node 16b) in a network. The messages may carry information to the receiver (e.g., network node 16a) about the experienced interference situation at the transmitting node (e.g., network node 16b) and how the receiver (e.g., network node 16a) can mitigate such interference.

In one embodiment, the information may include relative changes of mitigation schemes to be applied at the receiver, e.g. "do more", "do less". Upon reception of such a message, the receiving node (e.g., network node 16a) may for instance change the power level with $-\Delta$ dB or $+\Delta$ dB respectively, and/or may change the antenna downtilt with $+\Delta$ degrees or $-\Delta$ degrees, and/or, apply a change to any other gradual mitigation scheme (e.g., taking the feedback in the messages into consideration as the mitigation techniques are being applied by the receiver).

In some embodiments, the specific mitigation scheme, if any, applied at the aggressor node (e.g., network node 16a) is up to its implementation and is generally unknown to the victim. However, exact knowledge of the mitigation scheme applied is not required for some embodiments. The victim (e.g., network node 16b) may simply give a positive or a negative feedback of the experienced effect of the applied mitigation scheme of the aggressor (e.g., network node 16a), whichever that may be. In one embodiment, the information is carried through reference signals (RSs) with the transmitting node (e.g., the victim node, such as, network node 16b) selecting the reference signal(s) to transmit depending on the information to convey.

In one embodiment, the message space may include at least two messages, which may be denoted as $m_1$ (e.g., positive mitigation indication, e.g., apply more mitigation) and $m_2$, (e.g., negative mitigation indication, e.g., apply less mitigation) with the messages being interpreted (e.g., by network node 16b) as follows:

$m_1$: I am being interfered with. Apply more mitigation schemes and/or increase the application of the mitigation scheme(s) currently being applied.

$m_2$: I am not being interfered/no longer being interfered with. No (additional) mitigation scheme should be applied and/or stop applying any mitigation schemes and/or reduce the application of the mitigation scheme (s) currently being applied.

In some embodiments, the second message may be interpreted (e.g., by network node 16b) to apply less mitigation schemes:

$m_1$: I am being interfered with. Apply more mitigation schemes and/or increase the application of the mitigation scheme(s) currently being applied.

$m_2$: I am not being interfered/no longer being interfered with. Apply less mitigation schemes.

Some embodiments allow the victim node (e.g., network node 16b) to indicate to the aggressor node(s) (e.g., network node 16a) to either apply more or less mitigation schemes until an "equilibrium" is reached, while at the same time keeping the complexity of the RS transmission and reception relatively low, because only two messages may, in some embodiments, be transmitted by the victim node and/or monitored by the aggressor node.

In some scenarios, a so-called "ping-pong" effect may occur as the victim node cannot convey the message to "maintain the current level of remote interference (RI) mitigation" and so may have to switch back and forth between transmitting $m_1$ and $m_2$. To avoid such "ping-pong" effects, in some embodiments, the victim node may apply a hysteresis threshold in its decision process of when to transmit $m_1$ and/or $m_2$. For example, a useful decision may be to transmit $m_1$ if the IoT level (or some other decision variable) is above $Y_0$ dB and to transmit $m_2$ otherwise. By applying a hysteresis threshold, the decision may instead be to transmit $m_1$ if the IoT level is above $Y_0-T$ dB, if the victim node is currently in the state of transmitting $m_1$, while it is $Y_0+T$ dB, if the victim node is currently in the state of transmitting $m_2$, where T is the hysteresis threshold level. That is, in such embodiments, the decision may depend on both on the IoT level and the state of the victim node.

In one embodiment, the reference signals RS-1 and RS-2 may be used for the purpose of $m_1$ and $m_2$.

In another embodiment, the message space includes more than two messages. For example, the message space may include three messages, with the following interpretations:

$m_1$: I am being interfered with. Apply more mitigation schemes and/or increase the application of the mitigation scheme(s) currently being applied.

$m_2$: I am not being interfered/no longer being interfered with. No (more) mitigation needs to be applied.

$m_3$: I am not being interfered/no longer being interfered with. Apply less mitigation.

A benefit of the three-message method is that ping-pong effects can be avoided without applying a hysteresis threshold.

Another embodiment generalizes the message space to N messages, each with a different indication to the receiver, e.g. "Reduce transmission power with 2 dB to mitigate the interference caused."

In one embodiment, a given node (e.g., network node 16b) may over time change the messages transmitted depending on the state of the node, e.g., starting to transmit $m_1$ until interference is no longer experienced, followed by transmitting $m_2$.

In one embodiment, a given node is simultaneously involved in closed-loop interactions with several other nodes (e.g., gNBs) and receives contradictory feedbacks from different peers (e.g., several messages indicate "apply less mitigation" and several messages indicate "apply more mitigation"). In that case, a given node (e.g., aggressor network node 16a) may take the decision on whether to apply more or less mitigation based on, for example, a majority vote. For example, if more messages indicate to apply less mitigation than the messages for applying more mitigation, the network node 16a may apply less mitigation according to the majority.

In a related embodiment, where a given node (e.g., network node 16a) is involved in several concurrent closed-loop interactions and contradictory information is received from different peers, message weighting may be introduced to improve the decision-making at the given node. In that case, the message space may be extended to enable quantifying the level of interference experienced by the sender (e.g., victim network node 16b). A possible set of values may include, in the increasing order of weights, a "low interference", "moderate interference" and "high interference" indication. Thus, in some embodiments, the victim network node(s) 16b may be able to indicate one level of interference (out of a set of potential interference levels) experienced so that the aggressor network node 16a can make a more informed decision when receiving multiple messages from several victim nodes.

In a related embodiment, where contradictory feedbacks are received from different peers and a given node (e.g., aggressor network node 16a) has converged to two possible settings, the message space may be extended to include messages indicating that "the previous adjustment increased the interference level from low to moderate/high (from moderate to high)" and/or that "the previous adjustment reduced the interference level from moderate/high to low (from high to moderate)". The given node may select the one of the two settings that caused a smaller number of "the previous adjustment increased the interference" or a larger number of "the previous adjustment reduced the interference" feedbacks.

In a related embodiment, a given node is simultaneously involved in closed-loop interactions with several network nodes 16 (e.g., gNBs) and receives contradictory feedbacks from different peers (e.g., several "apply less mitigation" and several "apply more mitigation" messages). In that case, a given network node 16 may decide to apply more mitigation as soon as one message indicates it.

In one embodiment, the action taken by an aggressor network node 16a may depend on the messages received and the remote interference being detected. One such implementation is provided in Table 2 below.

TABLE 2

Different states of an aggressor node in an embodiment where two messages are defined.

| State [#] | Received message | Action[1] | Transmitted message | Remote interference | Action[2,3] |
|---|---|---|---|---|---|
| 1 | No | — | No | Normal | — |
| 2 | No | — | No | High | Send $m_1$ |
| 3 | $m_1$ | Apply more mitigation schemes | No | Normal | Send $m_2$ |
| 4 | $m_1$ | Apply more mitigation schemes | No | High | Send $m_1$ |
| 5 | $m_2$ | Apply less mitigation schemes | No | Normal | Send $m_2$ |
| 6 | $m_2$ | Apply less mitigation schemes | No | High | Send $m_1$ |
| 7 | No | — | $m_1$ | Normal | Stop sending $m_1$ |
| 8 | No | — | $m_1$ | High | — |
| 9 | $m_1$ | Apply more mitigation schemes | $m_1$ | Normal | Send $m_2$ |
| 10 | $m_1$ | Apply more mitigation schemes | $m_1$ | High | — |
| 11 | $m_2$ | Apply less mitigation schemes | $m_1$ | Normal | Stop sending $m_1$ |
| 12 | $m_2$ | Apply less mitigation schemes | $m_1$ | High | — |
| 13 | No | — | $m_2$ | Normal | Stop sending $m_2$ |

TABLE 2-continued

Different states of an aggressor node in an embodiment where two messages are defined.

| State [#] | Received message | Action[1] | Transmitted message | Remote interference | Action[2,3] |
|---|---|---|---|---|---|
| 14 | No | — | $m_2$ | High | Send $m_1$ |
| 15 | $m_1$ | Apply more mitigation schemes | $m_2$ | Normal | — |
| 16 | $m_1$ | Apply more mitigation schemes | $m_2$ | High | Send $m_1$ |
| 17 | $m_2$ | Apply less mitigation schemes | $m_2$ | Normal | — |
| 18 | $m_2$ | Apply less mitigation schemes | $m_2$ | High | Send $m_1$ |

NOTE 1:
from received RS
NOTE 2:
from transmitted RS + remote interference detected
NOTE 3:
If only a single RS is transmitted by each node, the sending of one message would imply the stopping of sending the other message It could be noted that for a given implementation, not all steps in Table 2 would have to be implemented and/or performed.

Sending multiple messages over time from a given node could impact the detector performance, specifically if using a multi-shot detector, i.e., a detector that takes a decision on an RS being detected or not after N detection attempts. An example is shown in FIG. 13, where a 4-shot detector is shown attempting to detect $m_1$ or $m_2$ from a given node.

Figure 13:
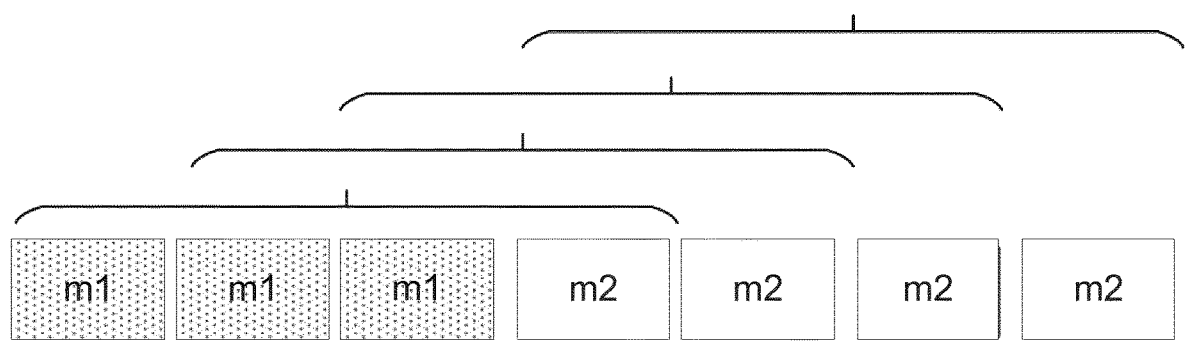
FIG. 13 illustrates an example of a four shot detector (sliding detection window shown with brackets) according to some embodiments of this disclosure.

FIG. 13 illustrates a message transmitting node (e.g., victim network node 16b) starting off with transmitting $m_1$ and then changing to $m_2$. Hence, the receiver (e.g., aggressor network node 16a) should be able to detect a pattern of $m_1$ and $m_2$ over a detection window, implying the search for $N^2$ possible message combinations (with the message space being two in the example).

In one embodiment, the detection performance may be improved by only letting a transmitter change the messages transmitted based on pre-defined rules/patterns.

In one such embodiment, the detection performance may be improved by only letting a transmitter change the message sent at specific points in time known to the receiver.

Some embodiments may include one or more of the following:

Embodiment A1. A network node configured to communicate with a wireless device (WD), the network node configured to, and/or comprising a radio interface and/or comprising processing circuitry configured to:
determine at least one message corresponding to a closed-loop feedback for remote interference mitigation; and
optionally transmit the at least one message.

Embodiment A2. The network node of Embodiment A1, wherein the processing circuitry is further configured to determine the at least one message by being configured to determine one of at least two messages, a first message of the at least two messages providing a positive mitigation indication to increase the remote interference mitigation and a second message of the at least two messages providing a negative mitigation indication to cease or decrease the remote interference mitigation.

Embodiment A3. The network node of Embodiment A2, wherein the determined message is one of three messages, wherein the second message provides a negative mitigation indication to cease the remote interference mitigation and a third message provides a negative mitigation indication decrease the remote interference mitigation.

Embodiment A4. The network node of Embodiment A1, wherein the processing circuitry is further configured to determine a level of remote interference experienced by the network node and select one of the at least one message to communicate based on the determined level of remote interference.

Embodiment A5. The network node of Embodiment A1, wherein the at least one message indicates a weight corresponding to a level of remote interference experienced by the network node.

Embodiment B1. A method implemented in a network node, the method comprising:
determining at least one message corresponding to a closed-loop feedback for remote interference mitigation; and
optionally transmitting the at least one message.

Embodiment B2. The method of Embodiment B1, wherein the determining the at least one message further comprises determining one of at least two messages, a first message of the at least two messages providing a positive mitigation indication to increase the remote interference mitigation and a second message of the at least two messages providing a negative mitigation indication to cease or decrease the remote interference mitigation.

Embodiment B3. The method of Embodiment B2, wherein the determined message is one of three messages, wherein the second message provides a negative mitigation indication to cease the remote interference mitigation and a third message provides a negative mitigation indication decrease the remote interference mitigation.

Embodiment B4. The method of Embodiment B1, further comprising determining a level of remote interference experienced by the network node and selecting one of the at least one message to communicate based on the determined level of remote interference.

Embodiment B5. The method of Embodiment B1, wherein the at least one message indicates a weight corresponding to a level of remote interference experienced by the network node.

Embodiment C1. A network node configured to communicate with a wireless device (WD), the network node configured to, and/or comprising a radio interface and/or comprising processing circuitry configured to:
receive at least one message, the at least one message corresponding to a closed-loop feedback for remote interference mitigation; and
take a mitigation action based on the received at least one message.

Embodiment C2. The network node of Embodiment C1, wherein the received at least one message is one of at least two messages, a first message of the at least two messages providing a positive mitigation indication to increase the remote interference mitigation being applied by the network node and a second message of the at least two messages providing a negative mitigation indication to cease or decrease the remote interference mitigation being applied by the network node.

Embodiment C3. The network node of Embodiment C2, wherein the received message is one of three messages, wherein the second message provides a negative mitigation indication to cease the remote interference mitigation being applied by the network node and a third message provides a negative mitigation indication decrease the remote interference mitigation being applied by the network node.

Embodiment C4. The network node of Embodiment C1, wherein the at least one message includes an indication of a level of remote interference to be mitigated by the network node.

Embodiment C5. The network node of Embodiment C1, wherein the at least one message indicates a weight corresponding to a level of remote interference to be mitigated by the network node.

Embodiment C6. The network node of Embodiment C1, wherein taking a mitigation action includes selecting and applying a mitigation technique based on the received at least one message.

Embodiment C7. The network node of Embodiment C1, wherein taking a mitigation action includes determining which mitigation technique to apply if a plurality of contradictory messages are received, the determination based at least in part on at least one of a majority rule, a weighted message, and an interference level indicated in the at least one received message.

Embodiment D1. A method implemented in a network node, the method comprising:
receiving at least one message, the at least one message corresponding to a closed-loop feedback for remote interference mitigation; and
taking a mitigation action based on the received at least one message.

Embodiment D2. The method of Embodiment D1, wherein the received at least one message is one of at least two messages, a first message of the at least two messages providing a positive mitigation indication to increase the remote interference mitigation being applied by the network node and a second message of the at least two messages providing a negative mitigation indication to cease or decrease the remote interference mitigation being applied by the network node.

Embodiment D3. The method of Embodiment D2, wherein the received message is one of three messages, wherein the second message provides a negative mitigation indication to cease the remote interference mitigation being applied by the network node and a third message provides a negative mitigation indication decrease the remote interference mitigation being applied by the network node.

Embodiment D4. The method of Embodiment D1, wherein the at least one message includes an indication of a level of remote interference to be mitigated by the network node.

Embodiment D5. The method of Embodiment D1, wherein the at least one message indicates a weight corresponding to a level of remote interference to be mitigated by the network node.

Embodiment D6. The method of Embodiment D1, wherein taking a mitigation action includes selecting and applying a mitigation technique based on the received at least one message.

Embodiment D7. The method of Embodiment D1, wherein taking a mitigation action includes determining which mitigation technique to apply if a plurality of contradictory messages are received, the determination based at least on part on at least one of a majority rule, a weighted message, and an interference level indicated in the at least one received message.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BS | Base Station |
| DCI | Downlink Control Information |
| DL | Downlink |
| FDD | Frequency Division Duplex |
| GP | Guard Period |
| LTE | Long Term Evolution |
| NR | New Radio |
| TDD | Time Division Duplex |
| PDCCH | Physical Downlink Control Channel |
| PDSCH | Physical Downlink Shared Channel |
| PUCCH | Physical Uplink Control Channel |
| PUSCH | Physical Uplink Shared Channel |
| RAT | Radio Access Technology |
| RB | Resource Block |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
    determining one of at least two reference signals corresponding to a closed-loop feedback for remote interference mitigation, the at least two reference signals comprising a first reference signal providing a positive mitigation indication indicating to increase the remote interference mitigation and a second message providing a negative mitigation indication indicating one of to cease and decrease the remote interference mitigation; and
    transmitting the determined one of the at least two reference signals to another network node.

2. The method of claim 1, wherein determining the one of the at least two messages further comprises:
    selecting at least one of the reference signals to transmit.

3. The method of claim 1, wherein the remote interference mitigation comprises at least one of:
    downtilting a transmit antenna radiation pattern;
    reducing a transmission power; and
    increasing a guard period.

4. The method of claim 1, wherein determining the one of the at least two messages further comprises:
    determining one of three reference signals, the second reference signal providing the negative mitigation indication indicating to cease the remote interference mitigation and a third reference signal of the three reference signals providing a negative mitigation indication to decrease the remote interference mitigation.

5. The method of claim 1, further comprising:
    determining a level of remote interference experienced by the network node; and
    selecting the one of the at least two reference signals based on the determined level of remote interference.

6. The method of claim 1, wherein the one of the at least two reference signals indicates a weight corresponding to a level of remote interference experienced by the network node.

7. A method implemented in a network node, the method comprising:
    receiving one of at least two reference signals corresponding to a closed-loop feedback for remote interference mitigation, the at least two reference signals comprising a first message and a second message, the first reference signal providing a positive mitigation indication indicating to increase the remote interference mitigation and a second message providing a negative mitigation indication indicating one of to cease and decrease the remote interference mitigation; and
    taking a remote interference mitigation action based on the received one of at least two reference signals.

8. The method of claim 7, wherein the remote interference mitigation comprises at least one of:
    downtilting a transmit antenna radiation pattern;
    reducing a transmission power; and
    increasing a guard period.

9. The method of claim 7, wherein receiving the one of the at least two reference signals further comprises:
    receiving one of three reference signals, the second reference signal providing the negative mitigation indication indicating to cease the remote interference mitigation and a third reference signal of the three reference signals providing a negative mitigation indication to decrease the remote interference mitigation.

10. The method of claim 7, wherein the one of the at least two reference signals includes an indication of a level of remote interference to be mitigated by the network node.

11. The method of claim 7, wherein the one of the at least two reference signals indicates a weight corresponding to a level of remote interference to be mitigated by the network node.

12. The method of claim 7, wherein taking the remote interference mitigation action based on the received one of at least two reference signals further comprises:
    selecting and applying a mitigation technique based on the received one of at least two reference signals.

13. The method of claim 8, wherein taking the remote interference mitigation action based on the received one of at least two reference signals further comprises:
    determining which mitigation technique to apply if a plurality of contradictory reference signals are received, the determination based at least in part on at least one of a majority rule, a weight indicated in the one of the at least two reference signals, and an interference level indicated in the one of the at least two reference signals reference signals.

14. A network node configured to communicate with a wireless device, WD, the network node comprising processing circuitry, the processing circuitry configured to cause the network node to:
   determine one of at least two reference signals corresponding to a closed-loop feedback for remote interference mitigation, the at least two reference signals comprising a first reference signal providing a positive mitigation indication indicating to increase the remote interference mitigation and a second message providing a negative mitigation indication indicating one of to cease and decrease the remote interference mitigation; and
   transmit the determined one of the at least two reference signals to another network node.

15. The network node of claim 14, wherein the processing circuitry is further configured to cause the network node to determine the one of the at least two reference signals by being configured to cause the network node to:
   select at least one of the reference signals to transmit.

16. The network node of claim 14, wherein the remote interference mitigation comprises at least one of:
   downtilting a transmit antenna radiation pattern;
   reducing a transmission power; and
   increasing a guard period.

17. The network node of claim 14, wherein the processing circuitry is further configured to cause the network node to determine the one of the at least two reference signals by being configured to cause the network node to:
   determine one of three reference signals, the second reference signal providing the negative mitigation indication indicating to cease the remote interference mitigation and a third reference signal of the three reference signals providing a negative mitigation indication to decrease the remote interference mitigation.

18. The network node of claim 14, wherein the processing circuitry is further configured to cause the network node to:
   determine a level of remote interference experienced by the network node; and
   select the one of the at least two reference signals based on the determined level of remote interference.

19. The network node of claim 14, wherein the one of the at least two reference signals indicates a weight corresponding to a level of remote interference experienced by the network node.

20. A network node configured to communicate with a wireless device, WD, the network node comprising processing circuitry, the processing circuitry configured to cause the network node to:
   receive one of at least two reference signals corresponding to a closed-loop feedback for remote interference mitigation, the at least two reference signals comprising a first reference signal providing a positive mitigation indication and indicating to increase the remote interference mitigation and a second reference signal providing a negative mitigation indication indicating one of to cease and decrease the remote interference mitigation; and
   take a remote interference mitigation action based on the received one of at least two reference signals.

21. The network node of claim 20, wherein the remote interference mitigation comprises at least one of:
   downtilting a transmit antenna radiation pattern;
   reducing a transmission power; and
   increasing a guard period.

22. The network node of claim 20, wherein the processing circuitry is further configured to cause the network node to receive the one of the at least two reference signals by being configured to cause the network node to:
   receive one of three reference signals, the second reference signal providing the negative mitigation indication indicating to cease the remote interference mitigation and a third reference signal of the three reference signals providing a negative mitigation indication to decrease the remote interference mitigation.

23. The network node of claim 20, wherein the one of the at least two reference signals includes an indication of a level of remote interference to be mitigated by the network node.

24. The network node of claim 20, wherein the one of the at least two reference signals indicates a weight corresponding to a level of remote interference to be mitigated by the network node.

25. The network node of claim 20, wherein the processing circuitry is further configured to cause the network node to take the remote interference mitigation action based on the received one of the at least two reference signals by being configured to cause the network node to:
   select and apply a mitigation technique based on the received one of at least two reference signals.

26. The network node of claim 20, wherein the processing circuitry is further configured to cause the network node to take the remote interference mitigation action based on the received one of the at least two reference signals by being configured to cause the network node to:
   determine which mitigation technique to apply if a plurality of contradictory reference signals are received, the determination based at least in part on at least one of a majority rule, a weight indicated in the one of the at least two reference signals, and an interference level indicated in the one of the at least two reference signals.

* * * * *